UNITED STATES PATENT OFFICE.

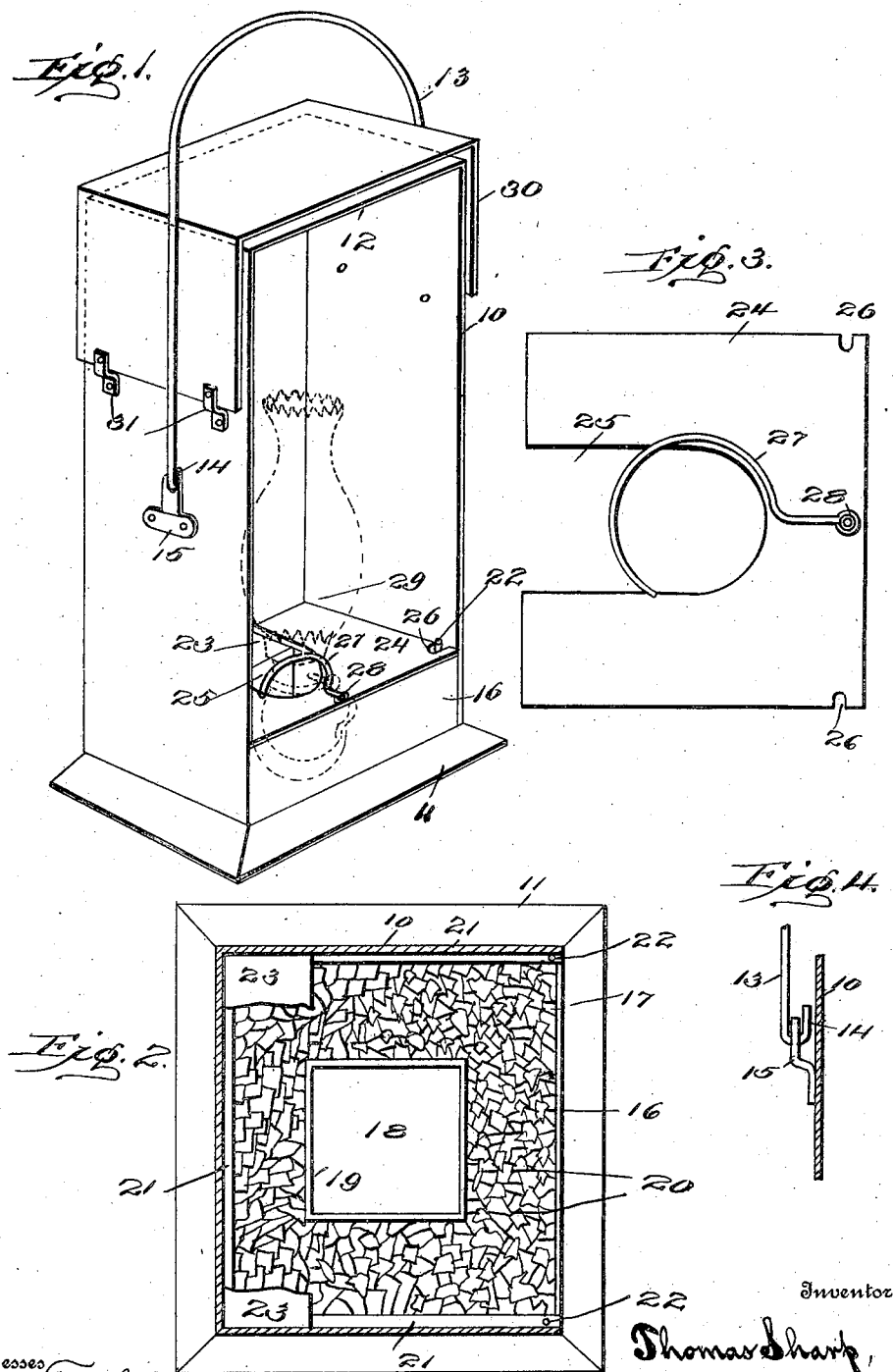

THOMAS SHARP, OF CARLISLE, PENNSYLVANIA.

HEATING DEVICE.

No. 847,121.　　　　Specification of Letters Patent.　　　Patented March 12, 1907.

Application filed August 30, 1906. Serial No. 332,637.

*To all whom it may concern:*

Be it known that I, THOMAS SHARP, a citizen of the United States, residing at Carlisle, in the county of Cumberland and State of Pennsylvania, have invented certain new and useful Improvements in Heating Devices; and I do hereby declare the following to be a full, clear, and exact description of the invention, such as will enable others skilled in the art to which it appertains to make and use the same.

This invention relates to heating devices, and especially to that class of heating devices arranged to accommodate and hold a lamp of substantially the ordinary construction and especially adapted and designed for use in a vehicle.

The object of the invention is to provide in a device of the class improved means for maintaining the heating device in the position in which it is disposed.

A further object of the invention is to provide a casing having improved means for engaging and retaining a heating element within the casing.

With these and other objects in view the invention comprises certain other novel constructions, combination, and arrangements of parts, as will be hereinafter fully described and claimed.

In the drawings, Figure 1 is a perspective view of the improved heating device. Fig. 2 is a transverse horizontal view of the device, showing the ballast-chamber in plan. Fig. 3 is a top plan view of the heating-element-retaining chamber. Fig. 4 is a detail view of one of the ears by means of which the bail is attached to the casing.

Like characters of reference designate corresponding parts throughout the several views.

In its preferred embodiment the heating device forming the subject-matter of this application comprises a casing 10, having any approved form of base, as 11. The casing 10 is open at one side and at the top is provided with any approved form of closure, as the end portion 12, it being understood, however, that the particular end piece shown does not form an essential part of the present invention and that the said invention is not limited thereto, embracing any form of closure at the top, as an end inclined to the sides or a curved top. The casing 10 is provided with a bail 13, having hooked portions 14, turned inwardly and inserted through ears, as 15, riveted or otherwise secured to the sides of the casing. The front or open side of the casing is closed for a short distance at the bottom, as by the plate 16, forming with the lower end of the casing a receptacle, as 17, within which is formed a chamber 18 by the walls 19, here shown as rectangular, but not limited to such form. The receptacle 17, formed between the casing 10 and the plate 16 and externally of the wall 19, is designed to accommodate any convenient and approved form of ballast, as the broken stone or other heavy material shown at 20 in Fig. 2.

The casing 10 is provided about its inner surface with a cleat 21, substantially level with the top of the plate 16, and adjacent the front side the said cleats are provided with upstanding studs 22. Above the receptacle 17 and at the rear side of the casing 10 is secured a plate 23, and a removable plate 24, provided with an opening 25, is arranged to be inserted within the casing and together with the plate 23 to cover the receptacle 17 and to leave the chamber 18 uncovered. The plate 24 is provided at opposite sides with notches 26, positioned to engage upon the pins 22, and a hook 27 is pivoted, as at 28, upon the said plate and disposed and adapted to engage any convenient portion of the heating element, as the lamp shown in dotted lines at 29. The upper end of the casing 10 is covered by a hood 30, conforming to the shape of and spaced from the top, sides, and back of the casing and secured in any approved manner, as by the tangs or clips 31.

For operation the receptacle 17 is filled with any improved and convenient form of ballast and the heating element 29 disposed within the chamber 18. The plate 24 is then inserted in such position that the slot 25 embraces some portion of the heating element and the notches 26 disposed to embrace the pins 22. The latch 27 is then snapped about a convenient portion of the heating element, which extends upwardly through the slot 25, and the device is in condition for use and may be carried by the bail 13. With the hooked portions 14 of the bail inserted through and within ears 15 the said hooks are in such position that objects will not catch thereupon and be damaged. The heater, arranged as shown in Fig. 1, may be set within any approved portion of a carriage or vehicle and after being covered by the usual robes or other wrappings the heat therefrom will surround the occupants and retain the inclosed atmosphere in a warmed condition.

What I claim is—

1. In a device of the class described, a casing open at one side and proportioned to receive and accommodate a heating element, cleats along the sides of the casing and parallel with the bottom, upright studs extending above the cleats, a bifurcated plate proportioned to be inserted within the casing and resting upon the cleats, and provided with notches formed in the opposite sides positioned to engage upon the studs, and a latch pivoted upon the plate and proportioned to removably engage a convenient part of the heating element.

2. In a device of the class described, a casing opened at one side, a heating element positioned within the casing, cleats upon the sides of the casing, studs projecting from the cleats, a plate resting upon the cleats and engaging the studs, and a hook pivotally connected to the plate and serving to retain the heating element in position.

In testimony whereof I affix my signature in presence of two witnesses.

THOMAS SHARP.

Witnesses:
E. M. BIDDLE, Jr.,
FRANK B. SETLEIGH.